United States Patent [19]

Perrin

[11] Patent Number: 5,036,125

[45] Date of Patent: Jul. 30, 1991

[54] SINGLE-COMPONENT, STORAGE-STABLE ORGANOPOLYSILOXANES CROSSLINKABLE INTO ELASTOMERIC STATE

[75] Inventor: Patrice Perrin, Lyons, France

[73] Assignee: Rhone-Poulenc Chimie, Courbevoie, France

[21] Appl. No.: 545,567

[22] Filed: Jun. 29, 1990

[30] Foreign Application Priority Data

Jun. 29, 1989 [FR] France ............................ 89 09005

[51] Int. Cl.$^5$ .................................................. C08K 3/38
[52] U.S. Cl. ................................. 524/405; 528/34;
528/901; 528/18; 528/15; 528/17; 428/447;
524/101; 524/720; 524/588; 524/448; 524/425;
524/445; 524/431; 524/433; 524/430; 524/423;
524/864; 524/789; 524/788; 524/783; 524/785;
524/779
[58] Field of Search ............... 528/34, 901, 18, 15,
528/17; 524/101, 720, 588, 448, 425, 445, 431,
433, 430, 405, 423, 864, 789, 788, 783, 785, 779,
786; 428/447

[56] References Cited

U.S. PATENT DOCUMENTS

| | | | |
|---|---|---|---|
| 4,495,331 | 1/1985 | Chung | 528/901 |
| 4,514,529 | 4/1985 | Beers et al. | 523/200 |
| 4,762,879 | 8/1988 | Letoffe et al. | 524/101 |
| 4,797,439 | 1/1989 | Peccoux | 528/34 |
| 4,873,305 | 10/1989 | Cavezzan et al. | 528/901 |

Primary Examiner—Melvyn I. Marquis
Assistant Examiner—M. Glass
Attorney, Agent, or Firm—Burns, Doane, Swecker & Mathis

[57] ABSTRACT

Single-component diorganopolysiloxane compositions, stable in storage in the absence of atmospheric moisture and crosslinkable into elastomeric state in the presence of moisture, well adapted, e.g., as sealants and adhesives for the construction industry, contain (A) a diorganopolysiloxane polymer having silanol endgroups, (B) a ketiminoxysilane crosslinking agent, (C) a stabilizing amount of an isocyanurate of the formula:

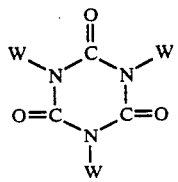

(1)

(D) an inorganic filler material, and (E) a metal curing catalyst.

10 Claims, No Drawings

SINGLE-COMPONENT, STORAGE-STABLE ORGANOPOLYSILOXANES CROSSLINKABLE INTO ELASTOMERIC STATE

BACKGROUND OF THE INVENTION

1. Field of the Invention

The present invention relates to novel organopolysiloxane compositions that are stable in storage in the absence of moisture, but crosslinkable into self-adhesive elastomeric state in the presence of moisture, and, more especially, to such novel organopolysiloxane compositions comprising, as essential constituents, an $\alpha,\omega$-dihydroxydiorganopolysiloxane polymer, a ketiminoxysilane crosslinking agent, an inorganic filler and a curing catalyst.

2. Description of the Prior Art

Single-component organopolysiloxane compositions crosslinkable into elastomeric state have long been known to this art. Compare, for example, French Patents FR-A-1,314,649, FR-A-1,371,250, U.S. Pat. Nos. 3,678,003 and 3,986,999, British Patent GB-A-1,468,467, Belgian Patent BE-A-901,479 and European Patent EP-A-157,580.

These compositions, designated oxime CVE (Cold Vinyl Elastomeric) compositions hereinafter, are particularly useful for coating and jointing applications and especially as a sealing agent in the construction industry for producing glazed structures.

For this particular application, the cured elastomer must not crack, must have a suitable modulus of elasticity and must firmly adhere to glass and to the material constituting the structure in which the glass is mounted, such as wood, aluminum, concrete, PVC (polyvinyl chloride), natural and synthetic rubbers, stone, earthenware and brick.

Such oxime CVE elastomeric compositions, more particularly when they contain pulverulent inorganic fillers of the ground quartz, ground or precipitated calcium carbonate or precipitated silica type, can have an insufficient stability (less than 6 months) in storage in the absence of atmospheric moisture, which is observed as a more or less rapid progressive loss of extrudability, in most cases with a deterioration in the adhesive properties.

This poor storage behavior is not due, as in the case of organopolysiloxane compositions containing an alkoxysilane crosslinking agent, to a poor functionalization of the $\alpha,\omega$-dihydroxy silicone oils by the ketiminoxysilane. In fact, ketiminoxysilanes react completely with the silanol endgroups of these oils at room temperature.

After long and costly research, it has now been determined that the degradation of the oxime CVE compositions in storage appears to be due essentially to the presence of water which is in most cases introduced by the pulverulent fillers.

SUMMARY OF THE INVENTION

Accordingly, a major object of the present invention is the provision of novel oxime CVE compositions containing an additive which removes trace amounts of water and improves the storage stability thereof (stability better than 6 months, preferably better than at least 1 year) without altering the other properties of the uncrosslinked composition (for example its extrudability) and of the crosslinked composition (in particular its adhesive properties).

The novel single-component oxime CVE compositions of the present invention:

(a) comprise an effective stabilizing amount of at least one isocyanurate of the formula:

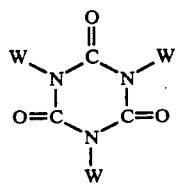

in which the symbols W, which may be identical or different, are each a monovalent hydrocarbon radical of the formula:

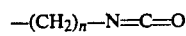

$-(CH_2)_n-N=C=O$ wherein n is an integer ranging from 1 to 12, inclusive, and (b) said oxime CVE compositions are devoid of any compound bearing a primary or secondary amine functional group.

The compounds of formula (1) are known to the art (EP-A-246,170) as a stabilizer for single-component CVE compositions.

However, the CVE compositions to be stabilized according to EP-A-246,170 are alkoxy CVE, and not oxime CVE compositions. Furthermore, according to EP-A-246,170, the compounds of formula (1) react principally with primary and secondary amine functionalization catalysts, hydroxylated silicone oils, such catalysts (in particular organic amines or alkoxyaminosilanes) being excluded from the oxime CVE compositions according to the present invention.

By "effective stabilizing amount" of the isocyanurate of formula (1) is intended an amount such that the isocyanurate has reacted with all of the water molecules present in the single-component oxime CVE composition during its packaging in a leakproof package, such as cartridges or drums.

As indicated above, this water is introduced principally by the pulverulent fillers incorporated into the oxime CVE composition.

Thus, the present invention features novel organopolysiloxane compositions that are stable in storage in the absence of moisture and crosslinkable into elastomeric state in the presence of moisture, which comprise:

(A) 100 parts by weight of at least one $\alpha,\omega$-dihydroxydiorganopolysiloxane polymer having a viscosity of 700 to 1,000,000 mPa.s at 25° C., comprising a plurality of diorganosiloxy recurring units of the formula $T_2SiO$, in which the radicals T, which may be identical or different, are each a hydrocarbon radical having from 1 to 10 carbon atoms, at least 50% of the number of the radicals T being methyl radicals;

(B) 0.5 to 20 parts by weight of at least one crosslinking agent comprising at least one ketiminoxysilane;

(C) an effective stabilizing amount of at least one isocyanurate of the formula:

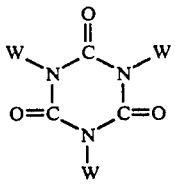

(1)

in which the symbols W, which may be identical or different, are each a monovalent hydrocarbon radical of the formula:

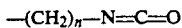

wherein n is an integer ranging from 1 to 12, inclusive;

(D) 5 to 250 parts by weight of an inorganic filler material; and (E) 0.0004 to 3 parts by weight of a metal curing catalyst, such compositions being devoid of any compound bearing a primary or secondary amine functional group.

DETAILED DESCRIPTION OF THE PREFERRED EMBODIMENTS OF THE INVENTION

More particularly according to the present invention, the α,ω-di(hydroxy)diorganopolysiloxane polymers (A) having a viscosity of 700 to 1,000,000 mPa.s at 25° C., preferably 1,000 to 700,000 mPa.s at 25°C., are linear polymers consisting essentially of diorganosiloxy recurring units of the above formula $T_2SiO$, and blocked by a hydroxyl group at each end of their polymer chain; however, the presence of monoorganosiloxy units of the formula $TSiO_{1.5}$ and/or of siloxy units of the formula $SiO_2$ is also within the scope of the invention in a proportion not exceeding 2% relative to the number of diorganosiloxy units.

The hydrocarbon radicals having from 1 to 10 carbon atoms, whether unsubstituted or substituted by halogen atoms or cyano groups and represented by the symbols T, include:

(i) alkyl and haloalkyl radicals having from 1 to 10 carbon atoms, such as methyl, ethyl, propyl, isopropyl, butyl, pentyl, hexyl, 2-ethylhexyl, octyl, decyl, 3,3,3-trifluoropropyl, 4,4,4-trifluorobutyl or 4,4,4,3,3-pentafluorobutyl radicals;

(ii) cycloalkyl and halocycloalkyl radicals having from 1 to 10 carbon atoms, such as cyclopentyl, cyclohexyl, methylcyclohexyl, propylcyclohexyl, 2,3-difluorocyclobutyl or 3,4-difluoro-5-methylcycloheptyl radicals;

(iii) alkenyl radicals having from 2 to 4 carbon atoms, such as vinyl, allyl or 2-butenyl radicals;

(iv) mononuclear aryl and haloaryl radicals having from 6 to 10 carbon atoms, such as phenyl, tolyl, xylyl, chlorophenyl, dichlorophenyl or trichlorophenyl radicals;

(v) cyanoalkyl radicals, the alkyl moiety of which has from 2 to 3 carbon atoms, such as β-cyanoethyl and τ-cyanopropyl radicals.

Methyl, phenyl, vinyl and 3,3,3-trifluoropropyl radicals are the preferred radicals T.

Exemplary of the units of formula $T_2SiO$, those of the following formulae are representative:
$(CH_3)_2SiO$,
$CH_3(CH_2=CH)SiO$,
$CH_3(C_6H_5)SiO$,
$(C_6H_5)_2SiO$,
$CF_3CH_2CH_2(CH_3)SiO$,
$NC-CH_2CH_2(CH_3)SiO$,
$NC-CH(CH_3)CH_2(CH_2=CH)SiO$,
$NC-CH_2CH_2CH_2(C_6H_5)SiO$.

It should be appreciated that the polymer (A) employed may be a mixture of α,ω-di(hydroxy)diorganopolysiloxane polymers which differ from each other in molecular weight and/or the nature of the groups bonded to the silicon atoms.

These α,ω-di(hydroxy)diorganopolysiloxane polymers (A) are available commercially; in addition, they can be easily manufactured according to techniques which are now well known to this art. It is desirable that these polymers be employed after they have been devolatilized, for example using the devolatilization process described in U.S. Pat. No. 4,356,116.

The crosslinking agents (B) are incorporated in a proportion of 0.5 to 20 parts, preferably 1 to 18 parts, per 100 parts of the α,ω-di(hydroxy)diorganopolysiloxane polymers (A). They are organosilicon compounds bearing at least two hydrolyzable ketiminoxy radicals per molecule which are bonded to the silicon atoms.

The crosslinking agent (B) preferably corresponds to the general formula:

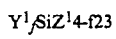

in which the symbol $Y^1$ is a $C_1$-$C_{10}$ hydrocarbon radical or a substituted such radical bearing one or more halogen atom or cyano substituents; the symbols $Z^1$, which may be identical or different, are each a hydrolyzable radical selected from those of the formulae:

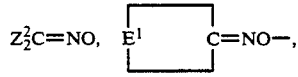

in which the symbols $Z^2$, which may be identical or different, are each a $C_1$-$C_8$ hydrocarbon radical and the symbol $E^1$ is a $C_4$-$C_8$ alkylene radical; and the symbol f represents zero or one.

The symbol $Y^1$ may have the same definition as the symbol T of the above units of formula $T_2SiO$; the specific examples of T are thus also applicable to $Y^1$.

The symbols $Z^2$ are $C_1$-$C_8$ hydrocarbon radicals and especially include:

(i) $C_1$-$C_8$ alkyl radicals, such as methyl, ethyl, propyl, isopropyl, butyl, isobutyl, 2-ethylhexyl or octyl radicals;

(ii) $C_5$-$C_8$ cycloalkyl radicals, such as cyclopentyl, cyclohexyl or methylcyclohexyl radicals;

(iii) mononuclear $C_6$-$C_8$ aryl radicals, such as phenyl, tolyl or xylyl radicals.

The symbol $E^1$ is a $C_4$-$C_8$ alkylene radical, for example those of the formulae: $-(CH_2)_4$, $-(CH_2)_5$, $-(CH_2)_6$, $-(CH_2)_7$, $-CH_2-CH_2-CH(C_2H_5)(CH_2)_3$, $-CH_2-CH_2CH(CH_3)CH_2CH_2$.

$CH_3Si[ON=C(CH_3)_2]_3$, $CH_3Si[ON=C(CH_3)C_2H_5]_3$ $CH_2=CHSi[ON=C(CH_3)C_2H_5]_3$, $C_6H_5Si\ ON[=C(CH_3)_2]_3$ $CH_3Si[ON=C(C_2H_5)(CH_2)_3CH_3]_2$ $(CH_3)_2C=NOSi[ON=C(CH_3)C_2H_5]_3$

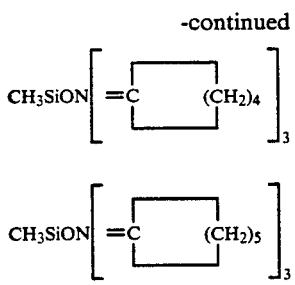

The isocyanurates (C) of formula (1) are well-known compounds, the processes for the preparation of which are described especially in European Patent EP-A-57,653.

The preferred isocyanurates are those in which n in formula (1) ranges from 4 to 8, inclusive, and in particular that in which n=6, marketed by Rhône-Poulenc under the trademark Tolonate HDT ®.

The stabilizing amounts of the compound of formula (1) to be incorporated depend on the quantity of water present in the CVE composition when it is deposited into a leakproof package as indicated above.

This amount can be measured and according to the invention it is then recommended to employ from 1 to 10 times, preferably from 1.5 to 5 times, the stoichiometric amount of isocyanurate which is required for converting, firstly, all of the water into carbamate functions.

For example, in a majority of cases from 0.001 to 10 parts by weight, preferably from 0.01 to 5 parts by weight of the isocyanurate are incorporated per 100 parts by weight of the oils (A).

The present invention has also made it possible to demonstrate that the carbamate thus produced and the excess isocyanurate had no detrimental effect on the mechanical properties of the elastomer and on the adhesiveness. On the contrary, it has been found that these materials prevent the appearance of cracks in the elastomers. Such resistance to cracking is a fundamental factor in the external bonded glass (structural glazing) and double-glazing applications.

Furthermore, the isocyanurate additives containing an isocyanate functional group according to the invention have the property of exhibiting a very low vapor pressure, of not coloring the CVE compositions after heating, of being stable up to temperatures which can exceed 220° C., of being completely miscible with silicones and of being odorless and nontoxic.

Incorporation of the isocyanurate (C) thus avoids the costly operation either of dehydration of the fillers by heating, or of treating these fillers with a water-repellent product such as, for example, calcium carbonate treated with stearic acid.

The inorganic fillers (D) are incorporated in a proportion of 5 to 250 parts, preferably 20 to 200 parts by weight, per 100 parts by weight of the $\alpha,\omega$-di(hydroxy)-diorganopolysiloxane polymers (A).

These fillers may be in the form of very finely divided materials whose mean particle diameter is less than 0.1 micrometer. Such fillers include pyrogenic silicas and precipitated silicas; their BET specific surface area is typically greater than 40 $m^2/g$.

These fillers may also be in the form of more coarsely divided materials, with a mean particle diameter greater than 0.1 micrometer. Exemplary of such fillers are ground quartz, diatomaceous silicas, calcium carbonate, calcined clay, titanium dioxide of the rutile type, iron, zinc, chromium, zirconium and magnesium oxides, the various forms of alumina (hydrated or otherwise), boron nitride, lithopone, barium metaborate, barium sulfate and ballotini; their specific surface area is typically less than 30 $m^2/g$.

These fillers (D) may have been surface-modified by treatment with the various ogranosilicon compounds usually employed for this purpose. Thus, these organosilicon compounds may be organochlorosilanes, diorganocyclopolysiloxanes, hexaorganodisiloxanes, hexaorganodisilazanes or diorganocyclopolysiloxanes (French Patents FR-A-1,126,884, FR-A-1,136,885, FR-A-1,236,505; British Patent GB-A-1,024,234). In most cases, the treated fillers contain from 3% to 30% of their weight of organosilicon compounds.

The fillers (D) may be a mixture of a number of types of fillers of different particle size range; thus, for example, they may comprise 5% to 95% of finely divided silicas having a BET specific surface area greater than 40 $m^2/g$ and 95% to 5% of more coarsely divided silicas having a specific surface area of less than 30 $m^2/g$, or treated or untreated calcium carbonate.

The compositions contain a catalyst (E), which is a compound of a metal typically selected from among tin, iron, titanium and zirconium.

From 0.0004 parts to 3 parts by weight of (E) are typically incorporated per 100 parts by weight of (A).

Insofar as tin is concerned, the most widely employed catalysts are dialkyltin dicarboxylates, in particular dibutyltin dilaurate or diacetate (see the Noll test, *Chemistry and Technology of Silicones*, page 337, 1968 edition), and dibutyltin diversates (French Patent FR-A-2,066,159).

It is also possible to use the products of reactions of dialkyltin dicarboxylates with polyalkoxysilanes or alkyl polysilicates (U.S. Pat. Nos. 3,186,963 and 3,862,919 and Belgian Patent BE-A-842,305).

It too is possible to use tin chelates, as described in European Patents EP-A-147,323 and EP-A-235,049.

Insofar as titanium and zirconium are concerned, it is possible to use the catalysts described in European Patent EP-A-102,268.

In addition to the constituents (A) to (E) described above, the compositions according to the invention may contain other ingredients.

Such other ingredients include organosilicon compounds, principally polymers which affect the physical characteristics of the compositions of the invention and/or the mechanical properties of the silicone elastomers produced from these compositions, incorporated in a proportion of 1 to 150 parts by weight per 100 parts by weight of (A).

These compounds are well known to this art; they comprise, for example:

(i) $\alpha,\omega$-bis(triorganosiloxy)diorganopolysiloxane polymers having a viscosity of at least 10 mPa.s at 25° C., in which the organic radicals bonded to the silicon atoms are methyl, vinyl and phenyl radicals; $\alpha,\omega$-bis(-trimethylsiloxy)dimethylpolysiloxane oils having a viscosity of 10 mPa.s at 25° C. to 1,500 mPa.s at 25° C. are preferably incorporated;

(ii) liquid branched methylpolysiloxane polymers containing from 0.1% to 8% of hydroxyl groups bonded to the silicon atoms, comprising $(CH_3)_3SiO_{0.5}$, $(CH_3)_2SiO$ and $CH_3SiO_{1.5}$ recurring units distributed such as to provide a $(CH_3)_3SiO_{0.5}/(CH_3)_2SiO$ ratio of 0.01 to 0.15 and a $CH_3SiO_{1.5}/(CH_3)_3SiO$ ratio of 0.1 to 1.5.

The above α,ω-bis(triorganosiloxy)diorganopolysiloxane polymers may be wholly or partially replaced by organic compounds which are inert towards the various constituents of the base compositions and miscible at least with the diorganopolysiloxane polymers (A).

Particularly exemplary organic plasticizers include petroleum cuts with a boiling point higher than 200° C., comprising a mixture of aliphatic and/or aromatic hydrocarbons, polybutylenes, preferably of low molecular weight, as described in French Patents FR-A-2,254,231, FR-A-2,293,831and FR-A-2,405,985, products of alkylation of benzene in particular, polyalkylbenzenes prepared by alkylation of benzene with linear or branched long chain olefins, in particular olefins having 12 carbon atoms produced by the polymerization of propylene, as described, for example, in French Patent FR-A-2,446,849.

It is also possible to incorporate mixed organic polydiorganosiloxane polymers such as polyoxyalkylene polyorganosiloxane block copolymers, phosphoric esters (FR-A-2,372,203), trioctyl phosphate (FR-A-2,415,132), dialcoholic esters of dicarboxylic acids (U.S. Pat. No. 2,938,007) and cycloalkylbenzenes (FR-A-2,392,476).

Benzene alkylation products having a molecular weight of more than 200, in particular alkylbenzenes and polyalkylbenzenes, are the preferred organic plasticizers.

Nonorganosilicon ingredients may also be introduced, for example heat stabilizers. These compounds improve the heat resistance of silicone elastomers. They may be selected from among carboxylic acid salts, rare earth oxides and hydroxides and, more especially, ceric oxides and hydroxides, and from pyrogenic titanium dioxide and the various iron oxides. From 0.1 to 15 parts by weight, preferably from 0.15 to 12 parts by weight of heat stabilizers are advantageously incorporated per 100 parts by weight of the diorganopolysiloxanes (A).

In a preferred embodiment of the invention, the subject compositions additionally comprise an adhesion promoter (F) which is a polyalkoxysilane bearing an epoxy-functional radical having from 4 to 20 carbon atoms, of the formula:

$$A-Si(OR'')_{3-a} \quad X_a$$

in which X is a hydrocarbon radical selected from among $C_1$-$C_4$ alkyl, vinyl and phenyl radicals; R'' is an alkyl or alkoxyalkyl radical having fewer than 8 carbon atoms; A is a hydrocarbon radical bearing an epoxy group and having from 4 to 20 carbon atoms; and a is 0 or 1.

From 0.1 to 15 parts by weight, preferably from 1 to 5 parts by weight of silane (F) are typically incorporated per 100 parts by weight of silicone oil (A).

Specific examples of these silanes are the following:

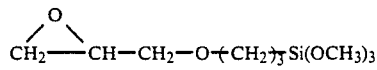

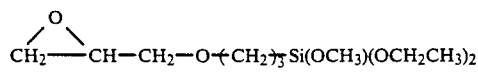

-continued

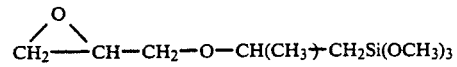

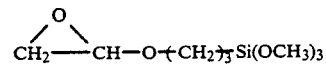

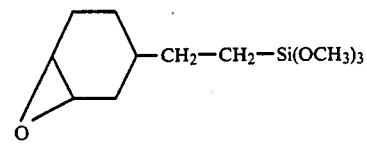

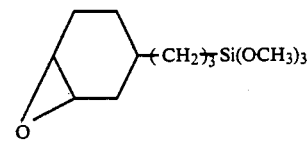

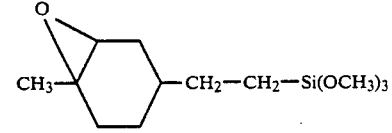

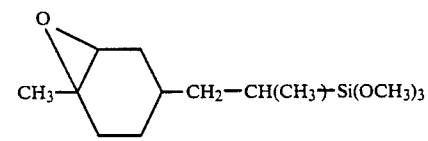

To formulate the compositions of this invention, it is necessary to employ an apparatus which makes it possible to thoroughly mix, in the absence of moisture and with and without a source of heat, the various basic constituents to which the aforementioned adjuvants and additives are optionally added.

According to the invention, it is recommended either to treat the filler (D) with the isocyanurate (C) by simple mixing, or to introduce the isocyanurate (C) into the composition immediately after the filler (D).

A more particularly preferred process entails introducing the ingredients in the following order into a mixer, with optional heating to a temperature of 50° to 150° C., in the absence of atmospheric moisture: the oil (A), optionally the plasticizer, the crosslinking agent (B), the filler (D), the isocyanurate (C), the catalyst (E) and, optionally, the epoxidized silane (F).

A degassing operation is then preferably carried out under a reduced pressure, for example ranging from 0.01 to 10 kPa.

The compositions according to the invention are stable in storage for at least 6 months and even one year, and can be employed more particularly for jointing in the construction industry, the assembly of the widest variety of materials (metals, plastics, natural and synthetic rubbers, wood, cardboard, earthenware, brick, ceramic, glass, stone, concrete, masonry elements), the insulation of electrical conductors, the coating of electronic circuits, the preparation of molds used for the manufacture of shaped articles made of synthetic resins or foams.

The compositions according to the invention may be optionally used after dilution in liquid organic compounds; the diluents are preferably the usual commercial products selected from among:

(i) halogenated or nonhalogenated aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene or orthodichlorobenzene;

(ii) aliphatic and cycloaliphatic ketones, such as methyl ethyl ketone, methyl isobutyl ketone, cyclohexanone or isophorone;

(iii) esters, such as ethyl acetate, butyl acetate or ethylglycol acetate.

The amount of diluent is typically rather small; it is generally less than 50% by weight relative to the total weight of the composition.

The aforesaid dilutions of these compositions in organic diluents can be employed more especially for the thin-layer impregnation of woven or nonwoven articles, or the coating of metal or plastic or cellulose-based sheets; however, they can be sprayed, for example by spraying using a paint gun, onto any substrates in the event that it is necessary to obtain a coating having a thickness on the order of 5 to 300 μm. After the dilute solutions have been sprayed, the diluents evaporate off and the compositions which are thus produced cure to a perfectly uniform rubbery film.

The curing time usually ranges from 5 minutes to a number of hours not exceeding 10 hours; this time depends on the factors mentioned above in connection with the curing period of compositions deposited as thicker layers, and also on the rate at which the diluents evaporate off. This technique of deposition by spraying is very practical for coating very large surface areas with a thin film, and more especially the hulls of ships and fishing nets. The deposition of a nonstick silicone film onto the surfaces of boats in contact with seawater prevents the fouling of these surfaces due to the attachment and development of marine organisms such as algae, barnacles, oysters or ascidians; this application is described, for example, in U.S. Pat. No. 3,702,778.

Furthermore, this film of elastomer can be used as an inert, nontoxic nonstick coating for various substrates in contact with food products, such as (1) wrapping papers for confectionery or deep-frozen meats, (2) metal dishes which can be employed for preparing ice creams and sorbets and (3) metal nets in which bread dough is deposited and molded, and which are introduced with their contents into bread baking ovens. It may also be used as a nonstick and nontoxic coating for materials in contact with the human body, such as compresses and special dressings for burns.

In order to further illustrate the present invention and the advantages thereof, the following specific examples are given, it being understood that same are intended only a illustrative and in nowise limitative.

In said examples to follow, all parts and percentages are given by weight, unless otherwise indicated.

EXAMPLE 1

The following constituents were introduced in succession and in this order, with protection against air, into a cylindrical kneader having a vertical axis, fitted with a three-bladed stirrer:

(i) 100 parts of an α,ω-dihydroxypolydimethylsiloxane oil having a viscosity of 20,000 mPa.s at 25° C.;

(ii) 40 parts of trimethylsilyl-blocked polydimethylsiloxane oil having a viscosity of 1,000 mPa.s at 25° C.;

(iii) 10 parts of a mixture of methyltris(methyl ethyl ketiminoxy)silane and vinyltris(methyl ethyl ketiminoxy)silane in a weight ratio of 1/1;

(iv) 15 parts of a pyrogenic silica having a BET specific surface area of 150 m²/g;

(v) 60 parts of ground quartz having a mean particle size of 5 μm;

(vi) 2.3 parts of tris(6-isocyanatohexyl) isocyanurate of the formula:

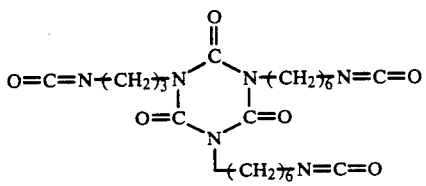

(vii) 0.1 part of dibutyltin dilaurate;

(viii) 2 parts of τ-glycidoxypropyltrimethyltrimethoxysilane.

The temperature inside the kneader increased from 25° to about 60° C. merely because of the frictional forces.

The kneading operation was completed by degassing under a reduced pressure ranging from 2.5 to 4 kPa.

The oxime CVE composition thus obtained was packaged in various cartridges sealed against atmospheric moisture.

The water introduced into the composition by the quartz corresponded to 0.15% of the weight of said ground quartz.

EXAMPLES 2, 3 and COMPARATIVE EXAMPLES 4C, 5C

Example 2

The procedure of Example 1 was repeated exactly, except that 4.6 parts of the isocyanurate were introduced.

EXAMPLE 3

The procedure of Example 2 was repeated exactly, except that the isocyanurate was introduced premixed with the epoxy silane.

EXAMPLE 4C

The procedure of Example 1 was repeated exactly, except that no isocyanurate was introduced.

EXAMPLE 5C

The procedure of Example 4C was repeated exactly, except that the ground quartz was treated at 100° C. beforehand until it no longer contained any traces of water.

EXAMPLE 6

Evaluation of storage stability

The change in extrudability of the compositions of Examples 1, 2, 3, 4C and 5C was evaluated as a function of the time t (in months) of storage in cartridges.

The extrudability is represented by the flow rate Q, in g/min, measured at the outlet of a cartridge 5.7 mm in diameter and at a manometric pressure of 0.2 MPa.

The results obtained for Q (t) are reported in the Table below:

TABLE

| Q (t) (g/min) | Example | | | | |
|---|---|---|---|---|---|
| | 4C | 5C | 1 | 2 | 3 |
| t = 0 | 320 | 300 | 390 | 230 | 290 |
| t = 1 month | 200 | 280 | 340 | 250 | 280 |
| t = 2 months | 160 | 290 | 350 | 260 | 240 |
| t = 3 months | 120* | 305 | 330 | 250 | 230 |
| t = 4 months | 50** | 290 | 300 | 250 | 225 |

\* = viscoelastic product
\*\* = practically nonextrudable

A degradation of the control composition (Example 4C was observed; this not only exhibited a reduced extrudability after 3 months of storage, but also became difficult to apply because of its viscoelastic consistency.

Heating of the quartz (Example 5C) made it possible to obtain a relatively stable composition, but such treatment cannot be used on an industrial scale.

The compositions of Examples 1, 2 and 3 could all be employed and displayed quite good stability of extrudability as a function of the length of the storage period.

Insofar as the mechanical properties of the elastomers produced after crosslinking in air are concerned, quite closely related values were obtained, whatever the examples - (2-mm thick films):

| | |
|---|---|
| Shore A hardness | 33 to 35 |
| 100% modulus | 0.8 to 1.1 MPa |
| Elongation at break | 290 to 320% |
| Tensile strength | 2.7 to 3.3 MPa |

Elastomers containing isocyanurate (Examples 1, 2 and 3) crosslinked well in depth (12 mm), whereas the control (Examples 4C and 5C) had a poorly crosslinked phase inside the seal.

The adhesion to glass and to anodized aluminum was comparable for elastomers originating from Example 4C, 5C, 1, 2 and 3. This result demonstrated that the addition of isocyanurate does not disturb this property.

EXAMPLE 7

Assessment of the appearance of cracks

To evaluate this characteristic, approximately 50 g of a CVE composition of Examples 1, 2, 3, 4C and 5C were confined between two rectangular plates (50×70 mm) kept separated by two 10-mm spacers. The composition was permitted to cure in air and the appearance of the mass was inspected daily throughout the vulcanization for one month.

The test was carried out with the two plates maintained vertically and with the two plates laid flat.

The elastomers produced from the compositions of Examples 1, 2 and 3 showed no cracking, the elastomers produced from the compositions of Examples 4C and 5C were cracked most of the time, in particular when the two plates were laid flat.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition stable in storage in the absence of moisture and crosslinkable into elastomeric state in the presence of moisture, which comprises:

(A) 100 parts by weight of at least one $\alpha, \omega$-dihydroxydiorganopolysiloxane polymer having a viscosity of 700 to 1,000,000 mPa.s at 25° C., comprising a plurality of diorganosiloxy units of the formula $T_2SiO$, in which the radicals T, which may be identical or different, are hydrocarbon radicals having from 1 to 10 carbon atoms, at least 50% of the number of such radials T being methyl radicals;

(B) 0.5 to 20 parts by weight of at least one ketiminoxysilane crosslinking agent;

(C) at least one isocyanurate of the formula:

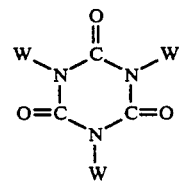

in an amount effective to react with all water molecules present in a single-component cold vulcanizable elastomer composition during its packaging in a leakproof package in which the symbols W, which may be identical or different, are monovalent hydrocarbon radicals of the formula:

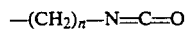

wherein n is an integer ranging from 1 to 12;

(D) 5 to 250 parts by weight of an inorganic filler material; and (E) 0.0004 to 3 parts by weight of a metal curing catalyst;

with the proviso that said composition is devoid of any compound bearing a primary or secondary amine functional group.

2. The organopolysiloxane composition as defined by claim 1, wherein formula (1) n=6.

3. The organopolysiloxane composition as defined by claim 1, comprising from 0.001 to 10 parts by weight of isocyanurate (C) per 100 parts by weight of polymer (A).

4. The organopolysiloxane composition as defined by claim 1, said filler (D) comprising pyrogenic silica, precipitated silica, ground quartz, diatomaceous silica, treated or untreated calcium carbonate, calcined clay, rutile titanium dioxide, iron, zinc, chromium, zirconium or magnesium oxides, hydrated or unhydrated alumina, boron nitride, lithopone, barium metaborate, barium sulfate or ballotini.

5. The organopolysiloxane as defined by claim 1, further comprising, per 100 parts by weight of polymer (A), from 0.1 to 15 parts by weight of a polyalkoxysilane of the formula:

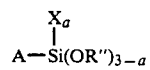

in which X is a $C_1$-$C_4$ alkyl, vinyl or phenyl radical; R" is an alkyl or alkoxyalkyl radical having less than 8 carbon atoms; A is a hydrocarbon radical bearing an epoxy group and having from 4 to 20 carbon atoms; and a is 0 or 1.

6. A sealed, moisture-proof package containing the organopolysiloxane composition as defined by claim 1.

7. A substrate coated with the organopolysiloxane composition as defined by claim 1.

8. A shaped article comprising the organopolysiloxane composition as defined by claim 1.

9. The organopolysiloxane composition as defined by claim 1, in crosslinked elastomeric state.

10. A shaped article comprising the crosslinked elastomer as defined by claim 9.

* * * * *